United States Patent
Lee et al.

(10) Patent No.: US 7,816,049 B2
(45) Date of Patent: Oct. 19, 2010

(54) DIRECT LIQUID FEED FUEL CELL

(75) Inventors: Seung-jae Lee, Seongnam-si (KR); Ji-rae Kim, Seoul (KR); Kyoung Hwan Choi, Suwon-si (KR); Jin-ho Kim, Seoul (KR); Yoon-hoi Lee, Seoul (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 706 days.

(21) Appl. No.: 11/445,338

(22) Filed: Jun. 2, 2006

(65) Prior Publication Data

US 2007/0099060 A1 May 3, 2007

(30) Foreign Application Priority Data

Nov. 2, 2005 (KR) .................. 10-2005-0104146

(51) Int. Cl.
*H01M 8/02* (2006.01)
*H01M 8/04* (2006.01)

(52) U.S. Cl. ..................... 429/456; 429/457

(58) Field of Classification Search .............. 429/38, 429/39
See application file for complete search history.

(56) References Cited

U.S. PATENT DOCUMENTS

| | | | | |
|---|---|---|---|---|
| 4,175,165 A * | 11/1979 | Adlhart | ............ | 429/30 |
| 5,364,711 A | 11/1994 | Yamada et al. | | |
| 6,593,085 B1 * | 7/2003 | Barnett et al. | ............ | 435/6 |
| 2003/0068544 A1 * | 4/2003 | Cisar et al. | ............ | 429/40 |
| 2003/0215686 A1 * | 11/2003 | DeFilippis et al. | ............ | 429/34 |
| 2004/0170878 A1 * | 9/2004 | Goebel | ............ | 429/26 |
| 2005/0074652 A1 | 4/2005 | Choi | | |
| 2005/0181264 A1 | 8/2005 | Gu et al. | | |
| 2005/0255373 A1 | 11/2005 | Kimura et al. | | |

FOREIGN PATENT DOCUMENTS

| | | |
|---|---|---|
| CN | 1679188 | 10/2005 |
| JP | 10-289723 | 10/1998 |
| JP | 2001-110432 | 4/2001 |

OTHER PUBLICATIONS

Office Action issued Mar. 14, 2008 by the State Intellectual Property Office of the People's Republic of China re: Chinese Application No. 2006101212370 (4 pp).
Letters Patent issued by the Chinese Intellectual Property Office in Chinese Patent Application No. 200610121237.0on Dec. 31, 2008.
Japanese Office Action dated Oct. 6, 2009, issued in a corresponding Japanese Patent Application.

* cited by examiner

*Primary Examiner*—Patrick Ryan
*Assistant Examiner*—Ashley Kwon
(74) *Attorney, Agent, or Firm*—Lee & Morse, P.C.

(57) ABSTRACT

A direct liquid feed fuel cell includes a membrane electrode assembly (MEA) including an anode electrode and a cathode electrode respectively disposed on either side of an electrolyte membrane. A conductive anode plate and a conductive cathode plate which respectively face the anode electrode and the cathode electrode, and have flow channels therein. Stripe-shaped hydrophilic members are formed on the cathode electrode, cross the flow channels of the conductive cathode plate, and transfer water from the flow channels to the conductive cathode plate. The conductive cathode plate is hydrophilic.

6 Claims, 9 Drawing Sheets

DIRECT LIQUID FEED FUEL CELL

CROSS-REFERENCE TO RELATED PATENT APPLICATION

This application claims the benefit of Korean Patent Application No. 2005-104146, filed on Nov. 2, 2005 in the Korean Intellectual Property Office, the disclosure of which is incorporated herein in its entirety by reference.

BACKGROUND OF THE INVENTION

1. Field of the Invention

Aspects of the present invention relate to a direct liquid feed fuel cell, and more particularly, to a direct liquid feed fuel cell having a structure that prevents an oxygen supply path from being blocked by water produced at a cathode electrode.

2. Description of the Related Art

A direct liquid feed fuel cell is an apparatus that generates electricity through an electrochemical reaction between an organic fuel (such as methanol or ethanol) and an oxidant (such as oxygen). A direct liquid feed fuel cell has high specific energy density and current density. Also, since a liquid fuel (such as methanol) is fed directly to the cell, the direct feed fuel cell does not require a peripheral device, such as a fuel reformer, and the storage and supply of the liquid fuel is easy.

As depicted in FIG. 1, a unit cell of a direct feed fuel cell has a membrane electrode assembly (MEA) structure including an electrolyte membrane 1 interposed between an anode electrode 2 and a cathode electrode 3. The anode electrode 2 includes a diffusion layer 22 for supplying and diffusing fuel, a catalyst layer 21 at which oxidation reaction of the fuel occur, and an electrode supporting layer 23. The cathode electrode 3 includes a diffusion layer 32 for supplying and diffusing an oxidant, a catalyst layer 31 on which reduction reaction of the fuel occurs, and an electrode supporting layer 33. Conductive plates 4 and 5 are respectively installed on the electrode supporting layers 23 and 33. The conductive plates 4 and 5 respectively include flow channels 41 and 51.

An electrode reaction of a direct methanol fuel cell (DMFC), which is a type of direct liquid feed fuel cell, includes an anode reaction in which fuel is oxidized and a cathode reaction in which hydrogen and oxygen are reduced as described below.

$$CH_3OH + H_2O \rightarrow CO_2 + 6H^+ + 6e^- \quad \text{(Anode reaction)} \quad \text{Reaction 1}$$

$$3/2\,O_2 + 6H^+ + 6e^- \rightarrow 3H_2O \quad \text{(Cathode reaction)} \quad \text{Reaction 2}$$

$$CH_3OH + 3/2\,O_2 \rightarrow 2H_2O + CO_2 \quad \text{(Overall reaction)} \quad \text{Reaction 3}$$

Carbon dioxide, six hydrogen ions, and six electrons are produced at the anode electrode 2 where the fuel is oxidized (reaction 1). The hydrogen ions migrate to the cathode electrode 3 through the hydrogen ion exchange membrane 1. At the cathode electrode 3, water is produced through the reduction reaction (reaction 2) between hydrogen ions, electrons transferred from an external circuit, and oxygen. Accordingly, water and carbon dioxide are produced as the result of the overall electrochemical reaction (reaction 3) between methanol and oxygen.

The theoretical voltage that can be generated by a unit cell of a DMFC is approximately 1.2 V. However, the open circuit voltage at ambient temperature and atmospheric pressure falls below 1 V due to a voltage drop caused by an activation overvoltage and an ohmic overvoltage. In reality, the actual operating voltage lies between 0.4 and 0.6 V. Therefore, to obtain higher voltages, a plurality of unit cells are connected in series. Methods of connecting the unit cells include a monopolar structure, in which a plurality of unit cells are formed on one electrolyte membrane, and a stacked structure, in which a plurality of unit cells are stacked.

Flow channels 41 are formed on a surface of the conductive plate 4 facing the cathode electrode 3. When water produced at the cathode electrode 3 forms large drops on the surface of the electrode supporting layer 33, the water drops blocks air flow, which results in unstable power generation.

SUMMARY OF THE INVENTION

Aspects of the present invention provide a direct liquid feed fuel cell having a structure that can readily remove water produced on an electrode supporting layer in flow channels for supplying oxygen to a cathode electrode.

According to an aspect of the present invention, there is provided a direct liquid feed fuel cell comprising: a membrane electrode assembly (MEA) including an anode electrode and a cathode electrode respectively disposed on either side of an electrolyte membrane; a conductive anode plate and a conductive cathode plate which respectively face the anode electrode and the cathode electrode, and have flow channels therein; and a plurality of stripe-shaped hydrophilic members which are formed on the cathode electrode, crosses the flow channels of the conductive cathode plate, and transfers water from the flow channels to the conductive cathode plate, wherein the conductive cathode plate is hydrophilic.

According to an aspect of the present invention, the stripe-shaped hydrophilic member are formed of a mixed solution of ordered mesoporous silica and PVdF.

According to an aspect of the present invention, the stripe-shaped hydrophilic members have a width of 0.1 to 5 mm and are installed at an interval of 1 to 10 mm.

According to an aspect of the present invention, the stripe-shaped hydrophilic member covers 5 to 50% of a surface of the cathode electrode.

According to an aspect of the present invention, the stripe-shaped hydrophilic member form an angle of 45 to 90° with respect to the flow channel.

According to an aspect of the present invention, the stripe-shaped hydrophilic members are formed of a plurality of stripes.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and/or advantages of the present invention will become more apparent and more readily appreciated by describing in detail exemplary embodiments thereof with reference to the accompanying drawings in which.

DETAILED DESCRIPTION OF THE EMBODIMENTS

Figure 1:
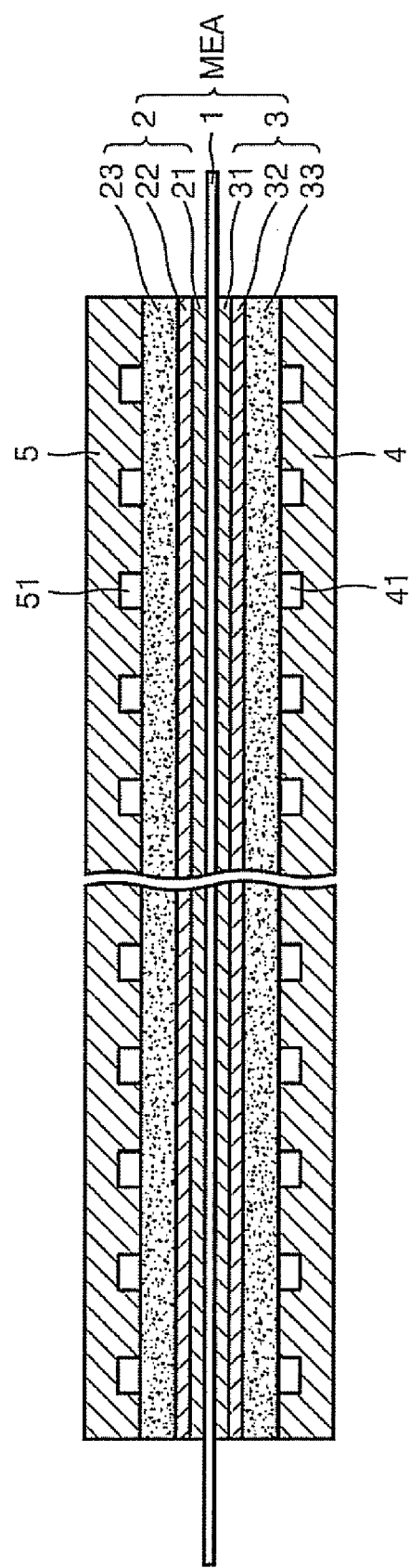
FIG. 1 is a cross-sectional view of a conventional direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
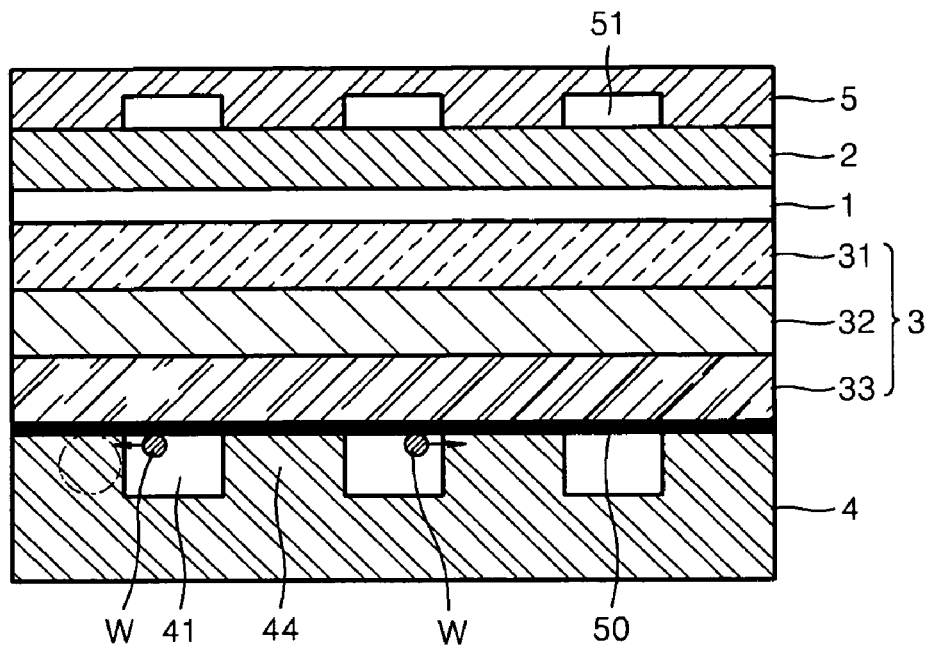
FIG. 2 is a partial cross-sectional view of a direct liquid feed fuel cell according to an embodiment of the present invention.
Figure 3:
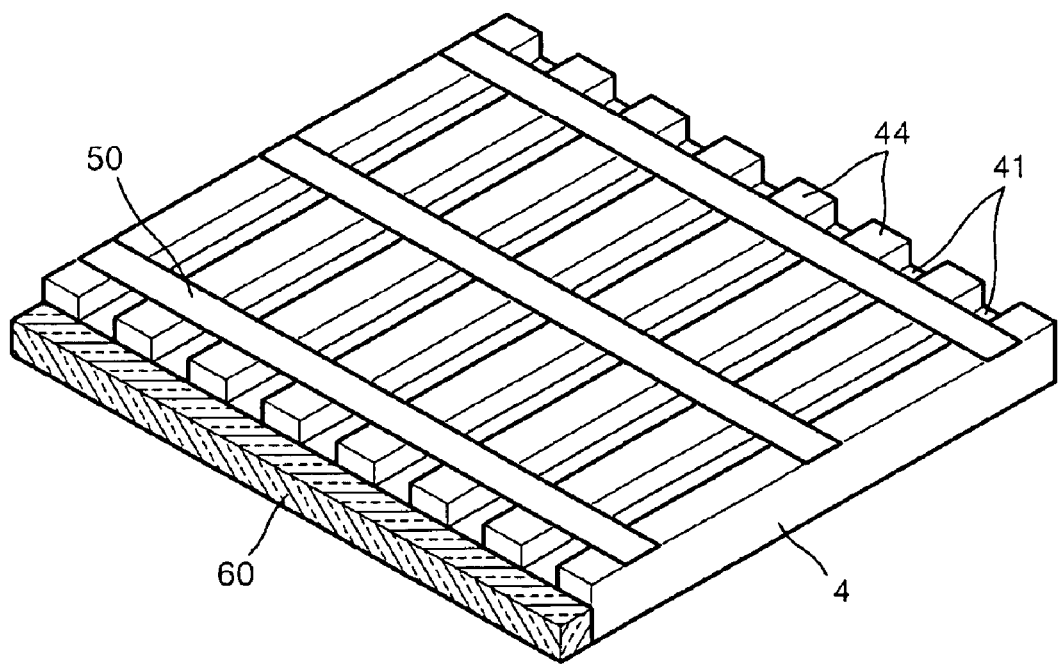
FIG. 3 is a perspective view of a stripe-shaped hydrophilic member contacting a cathode plate of FIG. 2 according to an embodiment of the present invention.

FIG. 2 is a partial cross-sectional view of a direct liquid feed fuel cell according to an embodiment of the present invention. FIG. 3 is a perspective view of a stripe-shaped hydrophilic member 50 contacting a cathode conductive plate 4 of FIG. 2.

Referring to FIGS. 2 and 3, the direct liquid feed fuel cell includes a membrane electrode assembly (MEA) having an electrolyte membrane 1, an anode electrode 2 and a cathode electrode 3 respectively formed on each side of the electrolyte membrane 1. A conductive anode plate 5 and the conductive cathode plate 4 which respectively face the anode electrode 2 and the cathode electrode 3 and have flow channels 41 and 51.

The cathode electrode 3 includes a catalyst layer 31, a diffusion layer 32, and an electrode supporting layer 33. The electrode supporting layer 33 can be a carbon supporting layer. The conductive cathode plate 4 has protrusion portions 44 that form a plurality of flow channels 41. Stripe-shaped hydrophilic members 50 are coated on a surface of the electrode supporting layer 33 and crosses the flow channels 41. The conductive cathode plate 4 is formed of a hydrophilic material. The anode electrode 2 and conductive anode plate 5 are generally as described with reference to FIG. 1, but can be otherwise constructed in other embodiments of the invention.

Figure 4:
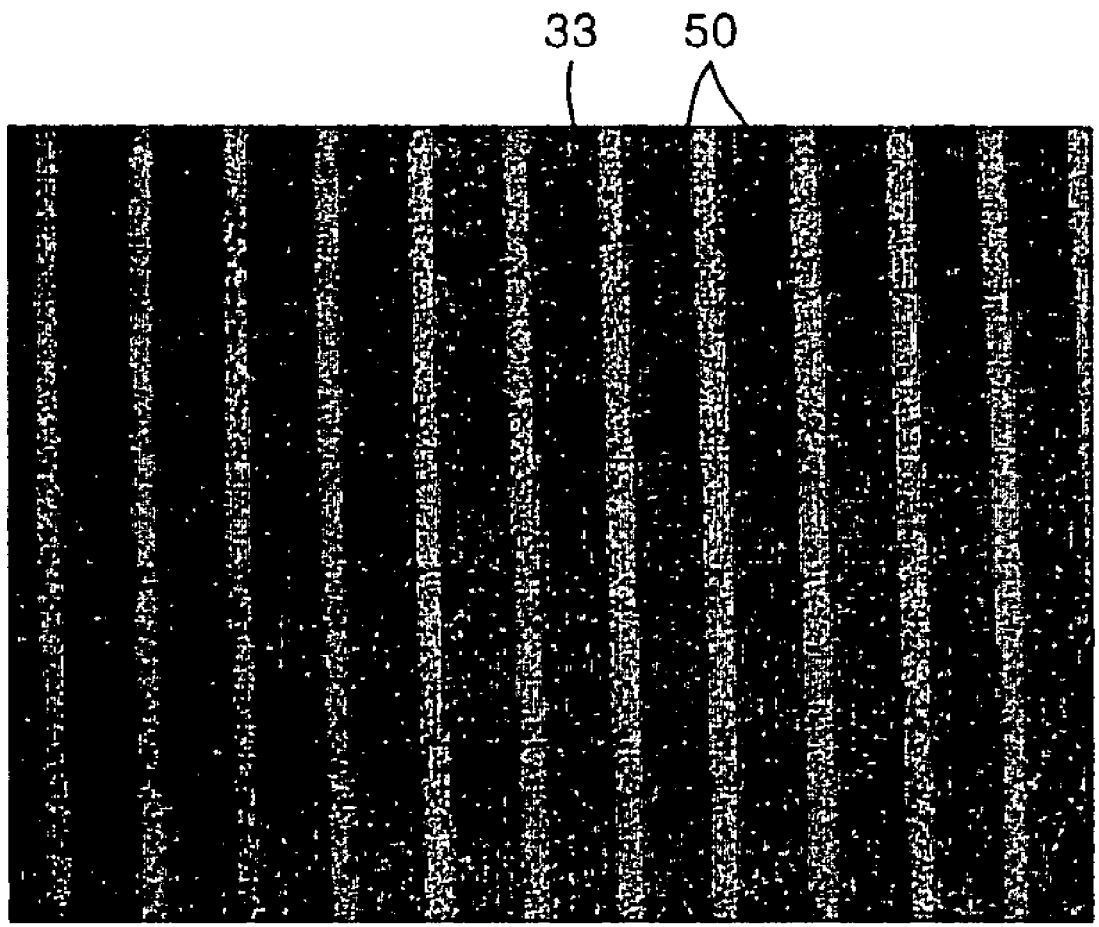
FIG. 4 is a photograph of the stripe-shaped hydrophilic member of FIG. 3 according to an example of the present invention.

Referring to FIG. 3, the protrusion portions 44 for air flow are disposed parallel to each other. The stripe-shaped hydrophilic member 50 is formed on the cathode electrode 3 and at angle to the channels 41 such that the members 50 cross the flow channels 41. FIG. 4 is a photograph of the stripe shape hydrophilic member 50 formed on the electrode supporting layer 33.

While not required in all aspects, the stripe-shaped hydrophilic member 50 can be formed of a mixed solution of ordered mesoporous silica (OMS) and polyvinylidene fluoride (PVdF). The stripe-shaped hydrophilic member 50 may have a width of 0.1 to 5 mm and an interval of 1 to 10 mm, and may cover at or between 5 and 50% of the total surface area of the cathode electrode 3. The stripe-shaped hydrophilic member 50 may have an angle of 45 to 90° with respect to the flow channel 41. Moreover, while shown as having a substantially constant width, it is understood that the width of the member 50 can be non-uniform in other aspects, such as to account for disproportionate water build up.

A moisture adsorbing member 60 such as a porous foam that adsorbs water adsorbed by the conductive cathode plate 4 may be disposed on a side of the conductive cathode plate 4. A water pump (not shown) for circulating water to the anode electrode 2 can be further included at the moisture adsorbing member 60. However, the member 60 and/or pump need not be used in all aspects of the invention.

The operation of the direct liquid feed fuel cell according to an embodiment of the present invention will now be described with reference to FIGS. 1 through 3. Water produced at the cathode electrode 3 is collected at the electrode supporting layer 33 through the diffusion layer 32. Water drops (W of FIG. 2) collected at the electrode supporting layer 33 are absorbed by the hydrophilic member 50 and transferred to the protrusion portions 44 of the conductive cathode plate 4 as depicted in FIG. 2. Next, the water adsorbed by the protrusion units 44 moves toward the moisture adsorbing member 60. Accordingly, the water produced by the cathode electrode reaction is readily removed from the flow channel 41 of the conductive cathode plate 4 and does not obstruct air flowing from the conductive cathode plate 4 toward the electrode supporting layer 33, thereby improving the performance of the fuel cell.

Figure 5A:
FIGS. 5A through 5D are cross-sectional views illustrating a method of manufacturing a direct liquid feed fuel cell according to an embodiment of the present invention.

FIGS. 5A through 5D are cross-sectional views illustrating a method of manufacturing a direct liquid feed fuel cell according to an embodiment of the present invention. Referring to FIG. 5A, a carbon supporting unit (a carbon paper) 33 is dipped in a 20 wt % Polytetrafluoroethylene (PTFE) solution. Next, a carbon slurry mixed with a 50 wt % PTFE solution is sprayed on the carbon paper 33 with a thickness of 1.5 mg/cm². The resultant product is annealed at a temperature of 350° C. for 30 minutes to form the carbon diffusion layer 32.

Figure 5B:
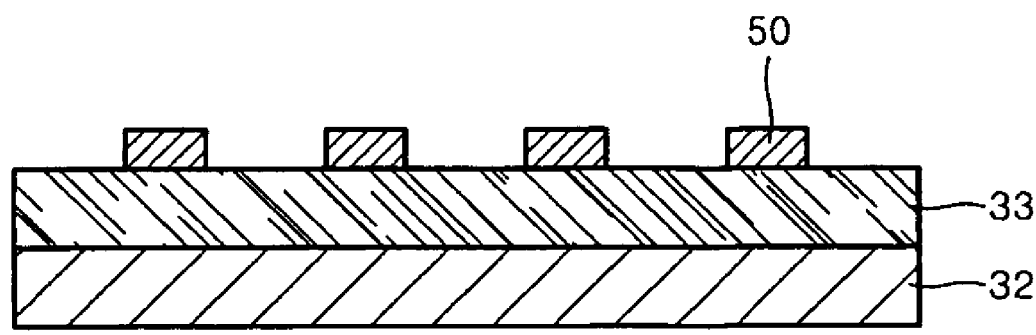

Referring to FIG. 5B, a hydrophilic solution for forming the stripe-shaped hydrophilic member 50 is prepared. To prepare such a hydrophilic solution, OMS and PVdF in a 1:1 weight ratio is added to acetone and stirred for 30 minutes. The hydrophilic solution is sprayed on the carbon paper 33 using a mask so that the width of the hydrophilic solution is 0.5 mm and the interval between portions of the sprayed solution is 3 mm, thereby manufacturing the stripe-shaped hydrophilic member 50. Next, the stripe-shaped hydrophilic member 50 is annealed at a temperature of 170° C. for 30 minutes. It is understood that the material can be otherwise applied, such as through photolithography, and or etching processes such that other methods can be used to form the member 50. Moreover, it is understood that the hydrophilic member 50 can be applied to the conductive cathode plate 4 instead of or in addition to being applied to the carbon paper 33.

Figure 5C:
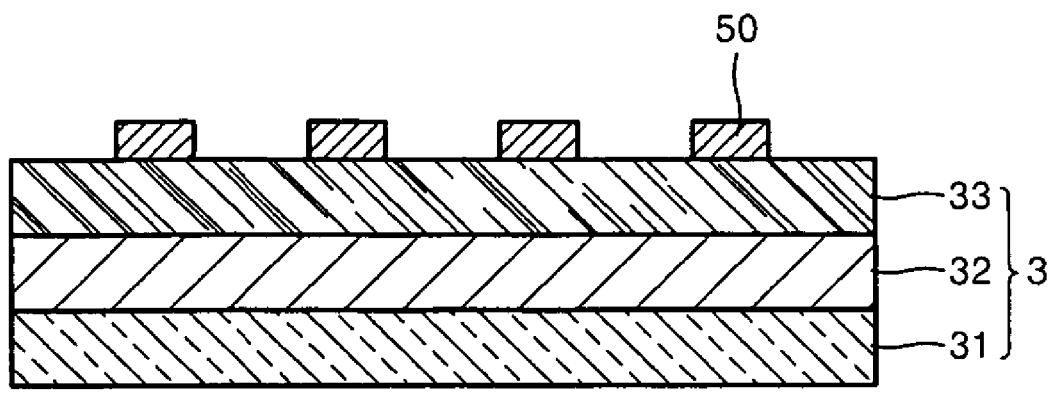

Referring to FIG. 5C, the catalyst layer 31 is sprayed on the carbon diffusion layer 32 with a loading of 6 mg/cm2. Next, the cathode electrode 3 is annealed at a temperature of 80° C. for 2 hours.

Figure 5D:
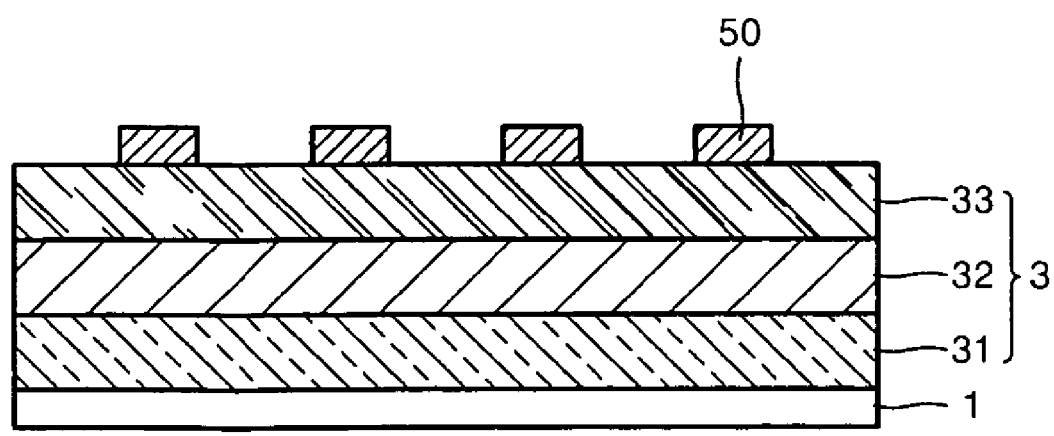

Referring to FIG. 5D, the cathode electrode 3 and an anode electrode 2 separately manufactured are thermally compressed with the electrolyte membrane 1 interposed therebetween at a temperature of 125° C. for 3 minutes under a pressure of 2 tons. However, it is understood that other materials, temperatures and processes can be used to create the members 50 according to aspects of the invention.

Figure 6:
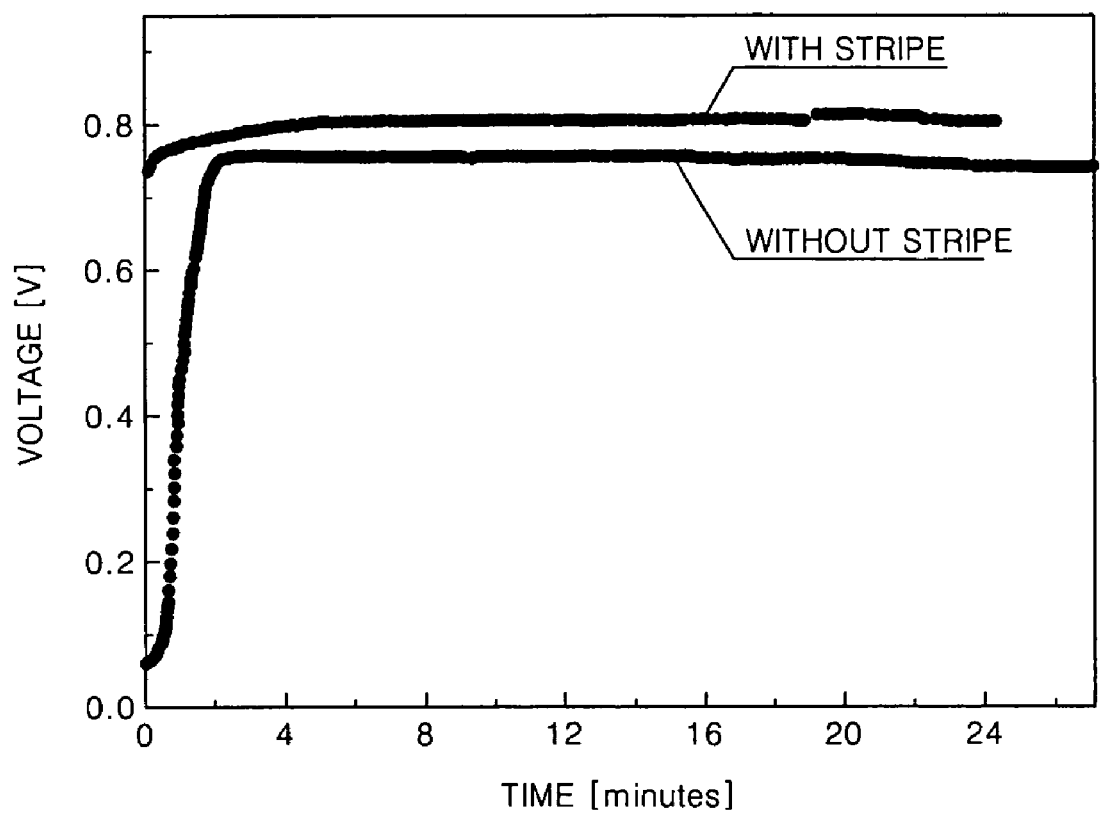
FIG. 6 is a graph showing results of an open circuit voltage measurement test performed on a direct liquid feed fuel cell according to an embodiment of the present invention.

FIG. 6 is a graph showing the results of an open circuit voltage measurement test performed on a direct liquid feed fuel cell according to an embodiment of the present invention.

For testing, air was supplied in a stoichiometric ratio of 3 to 1 mole of methanol. Voltages were measured at a temperature of 50° C., and the area of a unit cell was 10 cm$^2$. Referring to FIG. 6, the unit cell of the fuel cell that had the stripe-shaped hydrophilic member 50 showed similar voltage characteristics to the conventional fuel cell. This shows that the air flow in the cathode electrode 3 and the electrical conductivity of the carbon supporting unit 33 in the fuel cell according to an embodiment of the present invention are not affected by the stripe-shaped hydrophilic member.

Figure 7:
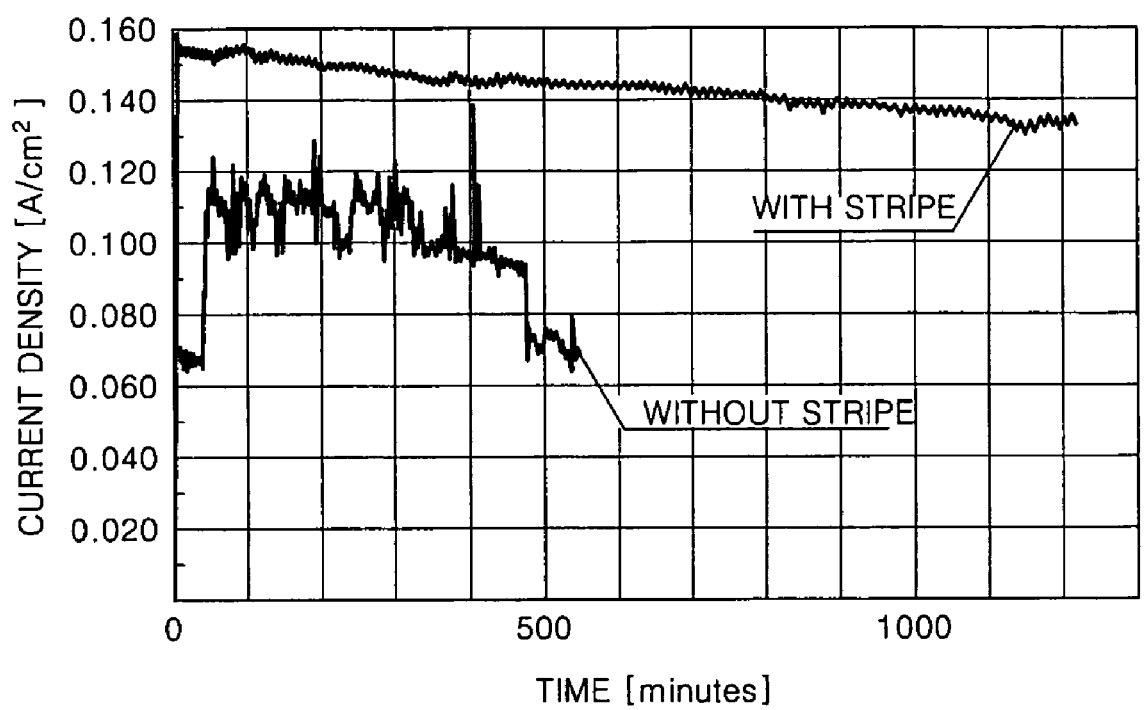
FIG. 7 is a graph showing results of a static voltage test at 0.3V performed on a direct liquid feed fuel cell according to an embodiment of the present invention.

FIG. 7 is a graph showing results of a static voltage test at 0.3V performed on a direct liquid feed fuel cell according to an embodiment of the present invention. For testing, air was supplied in a stoichiometric ratio of 3 to 1 mole of methanol. Current densities were measured at a temperature of 50° C., and the area of a unit cell was 10 cm$^2$. Referring to FIG. 7, the unit cell of the fuel cell that used a cathode electrode having the stripe-shaped hydrophilic member 50 showed more stable current density than the conventional fuel cell. This shows that, in the fuel cell according to an embodiment of the present invention, the water flow in the cathode electrode 3 did not affect the air flow.

Figure 8:
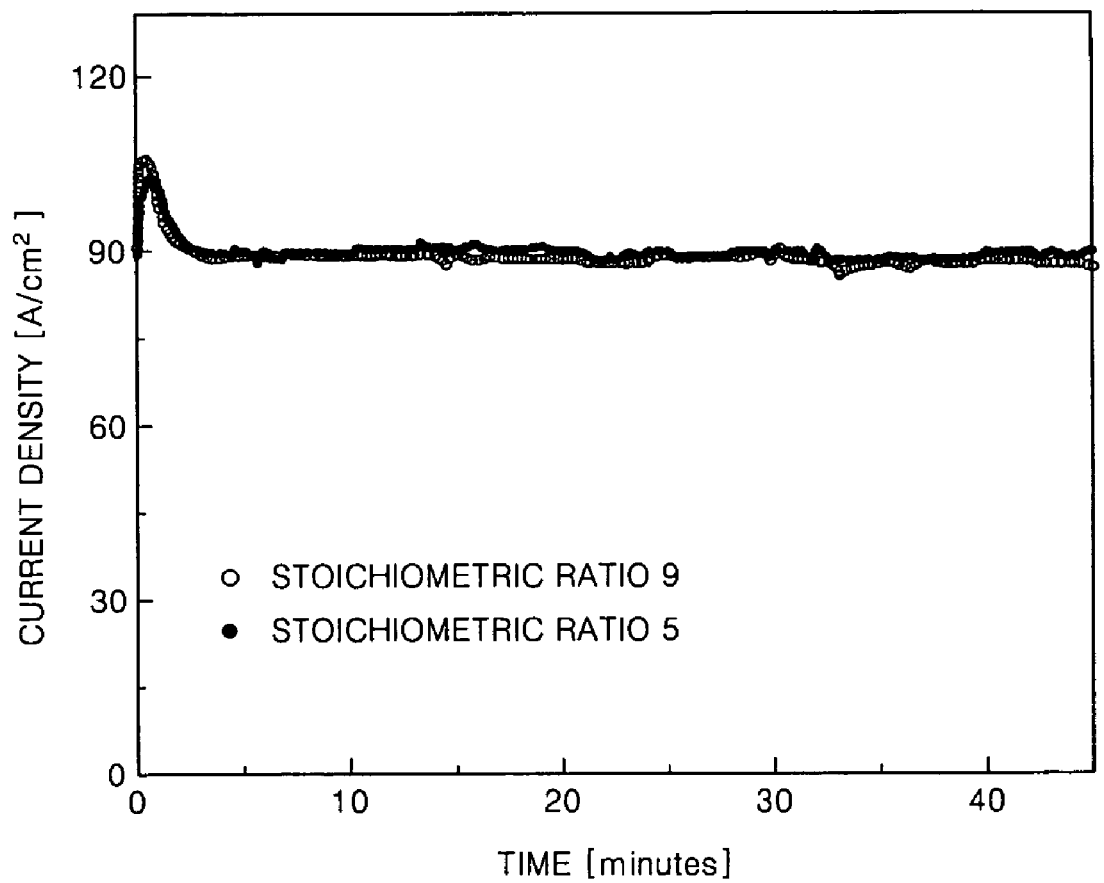
FIGS. 8 and 9 are graphs showing the results of static voltage tests at 0.4V performed on a conventional fuel cell that does not use a stripe-shaped hydrophilic member and a direct liquid feed fuel cell that uses a stripe-shaped hydrophilic member according to an embodiment of the present invention.
Figure 9:
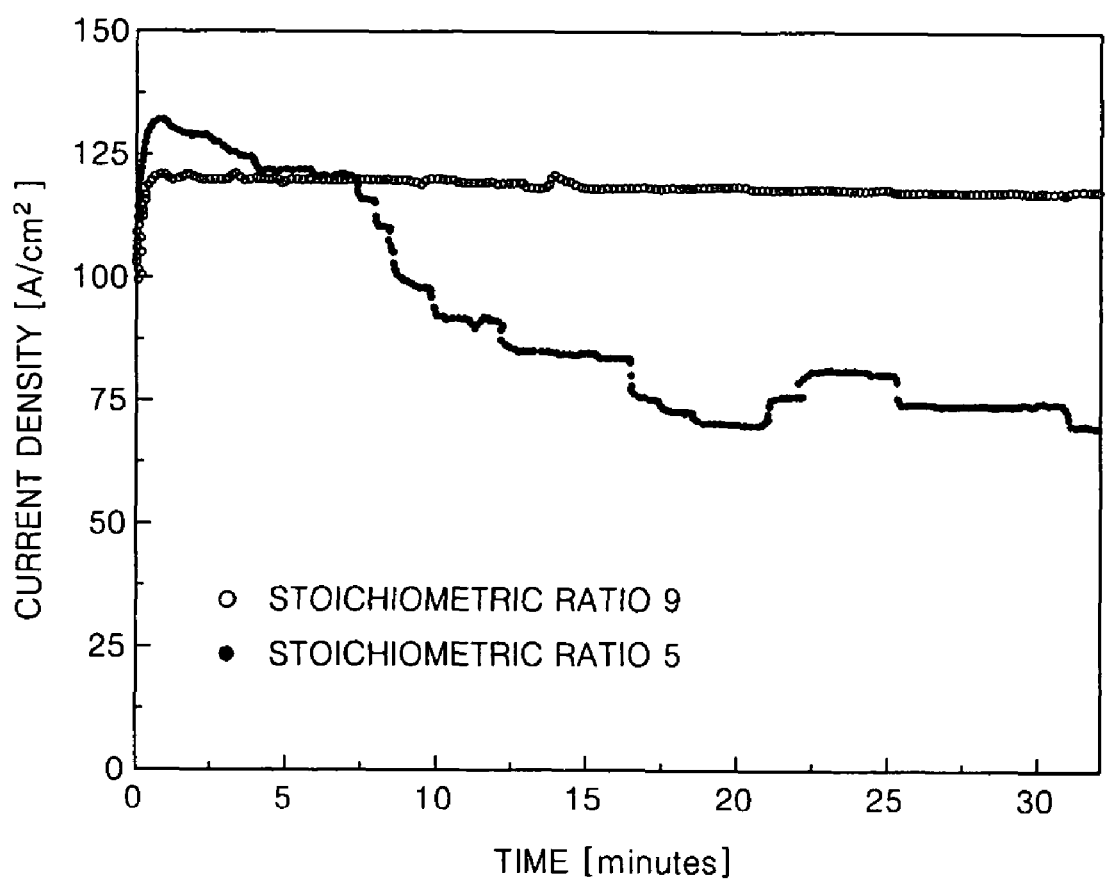

FIGS. 8 and 9 are graphs showing the results of static voltage tests at 0.4V performed on a conventional fuel cell that does not use a stripe-shaped hydrophilic member 50 and a direct liquid feed fuel cell that uses a stripe-shaped hydrophilic member 50 according to an embodiment of the present invention. For testing, air was supplied in a stoichiometric ratio of 5 and 9 to 1 mole of methanol. Current densities were measured at a temperature of 50° C., and the area of a unit cell was 25 cm$^2$.

When air was supplied in a stoichiometric ratio of 9 moles to 1 mole of methanol, both the conventional fuel cell (FIG. 9) and the fuel cell according to an embodiment of the present invention (FIG. 8) showed stable current densities. When air was supplied in a stoichiometric ratio of 5 to 1 mole of methanol, the conventional fuel cell showed very unstable and gradually reducing current density, but the fuel cell that used the cathode electrode 3 having the stripe-shaped hydrophilic member 50 according to an embodiment of the present invention showed very stable and constant current density. This indicates that, in the fuel cell according to an embodiment of the present invention, the air flow in the carbon supporting unit 33 was not affected by water drops, even at a low airflow rate, since the stripe-shaped hydrophilic member 50 effectively removed water from the cathode electrode 3.

As described above, a direct liquid feed fuel cell according to aspects of the present invention includes a stripe-shaped hydrophilic member between a cathode electrode and a conductive plate. Therefore, water produced at the cathode electrode is transferred to the hydrophilic conductive plate and is further transferred to the moisture adsorbing member. Accordingly, airflow in the cathode electrode is smooth, thereby maintaining a stable output voltage of the fuel cell.

While not limited thereto, it is understood that the fuel cell of the present invention is usable in portable electronics, vehicles, and other devices needing a power supply.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A fuel cell comprising:
   a membrane electrode assembly (MEA) including an electrolyte membrane disposed between an anode electrode and a cathode electrode, wherein the cathode electrode comprises, in order from the closest to the farthest from the electrolyte membrane, a catalyst layer contacting the electrolyte membrane, a diffusion layer and an electrode supporting layer;
   a conductive cathode plate facing the cathode electrode, the conductive cathode plate having a plurality of flow channels therein; and
   a plurality of spaced-apart stripe-shaped members that are formed on a surface of the electrode supporting layer of the cathode electrode facing the conductive cathode plate such that each of the stripe-shaped members crosses the plurality of flow channels of the conductive cathode plate, wherein the plurality of stripe-shaped members together cover 5 to 50% of a surface of the electrode supporting layer and wherein the stripe-shaped members are hydrophilic and are positioned to transfer water from the flow channels to the conductive cathode plate, and
   wherein the conductive cathode plate is hydrophilic.

2. The direct liquid feed fuel cell of claim 1, wherein the spaced apart stripe-shaped hydrophilic members each comprise a mixed solution of ordered mesoporous silica and PVdF.

3. The direct liquid feed fuel cell of claim 1, wherein the spaced apart stripe-shaped hydrophilic members each have a width of 0.1 to 5 mm and are installed at an interval of 1 to 10 mm.

4. The direct liquid feed fuel cell of claim 1, wherein at least one of the spaced apart stripe-shaped hydrophilic members form an angle of 45 to 90° with respect to the flow channel.

5. The direct liquid feed fuel cell of claim 1, further comprising a moisture adsorbing member on a side of the conductive cathode plate.

6. The direct liquid feed fuel cell of claim 5, further comprising a water pump connected to an end of the moisture adsorbing member.

* * * * *